(12) United States Patent
Wong et al.

(10) Patent No.: US 6,856,380 B2
(45) Date of Patent: Feb. 15, 2005

(54) AERIAL VEHICLE SPEED ERROR CORRELATION METHOD FOR TWO-DIMENSIONAL VISUAL REPRODUCTION OF LASER RADAR IMAGING

(75) Inventors: Kwo-Jyr Wong, Taipei (TW); Kuo-Shu Chang, Taipei (TW); Re-Fun Chen, Taoyuan Hsein (TW)

(73) Assignee: Chun-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 10/336,846

(22) Filed: Jan. 6, 2003

(65) Prior Publication Data

US 2004/0169844 A1 Sep. 2, 2004

(51) Int. Cl.⁷ ............................. G01C 3/08; H04N 7/18; G06K 9/00
(52) U.S. Cl. ........................ 356/4.01; 348/147; 382/108
(58) Field of Search ........................ 356/4.01; 382/108; 348/144–147

(56) References Cited

U.S. PATENT DOCUMENTS

| | | | | |
|---|---|---|---|---|
| 4,878,183 A | * | 10/1989 | Ewart | |
| 5,187,754 A | * | 2/1993 | Currin et al. | |
| 5,481,479 A | * | 1/1996 | Wight et al. | |

\* cited by examiner

Primary Examiner—Stephen C. Buczinski
(74) Attorney, Agent, or Firm—Johnson, Lin & Associates, PC; Chauncey B. Johnson, Esq.

(57) ABSTRACT

An aerial vehicle speed correlation method for two-dimensional visual reproduction of laser radar images of the present invention is capable of altering and controlling the output timing of the invention's laser radar system rated output lines based on the moving distance and the speed of an aerial vehicle. The speed error correlation method of the present invention is not limited to outputting one output line for every scanned line (N) for reducing the accumulation of geometric distortion error along the in-track direction of the scan frame. The speed correlation method of the present invention uses a set of generated fire table of equation to correct tangential error along the cross-track direction and to improve the reproduction quality of the laser radar images.

5 Claims, 9 Drawing Sheets

AERIAL VEHICLE SPEED ERROR CORRELATION METHOD FOR TWO-DIMENSIONAL VISUAL REPRODUCTION OF LASER RADAR IMAGING

BACKGROUND OF THE INVENTION

1. Field of the invention

The present invention relates to an error correlation method for improving the quality of images photographed by an aerial vehicle using laser radar. More specifically, the present invention relates to the use of disclosed algorithms, which do not increase the system complexity and yet reduce the accumulation of in-track geometric distortion error during photographing. The present invention also discloses a fire table of equations used to improve the reproduction quality of the laser images by reducing tangential error accumulation in the cross-track direction during photographing.

2. Related Prior Art

The use of aerial vehicles to obtain aerial photographs of, for example, an object, a terrain or a plant, etc. on the ground is well known to individuals skilled in the art. Aerial laser photography is an essential part of commercial, military and economic information gathering activities. Aerial laser photography uses the fundamentals of "points", "lines" and "planes" to obtain desired photographs. Aerial laser photographs are produced by performing in-track point by point scanning with instant, one-shot laser pulse using rotational scan lenses, while an aerial vehicle maintains relative speed and travels in an orthogonal direction to establish a two-dimensional photograph. Each pixel of an obtained laser photograph is sampled at a different time. The operational mechanism of laser photography is quite different from the operational mechanism of conventional, camera-based photography which operates as a one time exposure and collects pixels one by one to form the desired photographs.

Because geometric distortion occurs in aerial laser radar photographs due to differences in both the sampling timing and the length of the sampling timing related prior arts have suggested two approaches for reducing in-track geometric distortion of aerial laser radar photographs by uniformly distributing the pixels across the photographs. The first approach is based on controlling the rotational speed of the scanning lens of the laser photographic system while keeping the relative speed of the aerial vehicle constant. The second approach is based on maintaining the rotational speed of the scanning lens of the laser photographic system at the existing speed of the aerial vehicle.

In the first approach, the related prior art uses fixed rotational speed during scanning while keeping the aerial vehicle at a constant speed so as to obtain laser radar photographs based on optimum in-track scan resolution. This approach is not without fault. When the laser radar photographic system is photographing from an aerial vehicle at high acceleration and high altitude it is difficult to maintain constant speed for a long duration due to unavoidable turbulence and wind direction changes. Also, obtaining good quality photographs depend on the performance of the laser radar itself, the stability of the relative positioning of the laser radar and the area to be photographed. If the relative positioning of both the former (laser radar) and/or the latter (area) are not stable, the photographs obtained through the laser radar system will be geometrically distorted due to inconsistent scanning points and inconsistent lines reproduced. Aerial photographs with geometric distortions are distorted representation of the areas photographed and thus lack value.

In the second approach, the related prior art controls the driving motor of the rotational speed of the scanning lens of the laser photographic system at the existing speed of the aerial vehicle. This approach attempts to maintain the driving motor speed of the scanning lens and the aerial vehicle speed at the same speed levels when photographing. This approach is also flawed because the response time for the motor to adjust and stabilize its speed may take as long as several seconds, especially for motors not equipped with speed reduction mechanism. For example, motors that use only inertia to reduce its speed may take a longer time.

In contrast to the approaches of the related prior art, the present invention discloses novel algorithms, which do not increase the system complexity and yet reduce the accumulation of in-track geometric distortion error during photographing. The present invention also discloses a fire table of equations for improving the reproduction quality of laser images by reducing tangential error accumulation in the cross-track direction during photographing.

SUMMARY OF THE INVENTION

An object of this invention is to disclose an aerial vehicle laser radar photographic system using a speed error correlation method for maintaining a distance between two image points at a 1:1 ratio in the in-track direction and the cross-track directions respectively; and for reproducing quality, two-dimensional, visual laser radar images.

Another object of this invention is to disclose ways of improving the quality of photographs obtained from aerial vehicles using the laser radar system of the present invention; that is by using disclosed algorithms which lack system complexity and are capable of reducing in-track and cross track geometric and tangential distortion errors associated with the laser radar's vision and thereby improving the quality of photographs obtained and reproduced.

Still, another object of this invention is to disclose controlling the timing of the rated output lines of the laser radar system of the present invention based on the distance and the speed of an aerial vehicle, and which are not limited to outputting one line outputted line for every N scanned line.

Still further, another object of the present invention is to disclose replacing the preset system rated output line data with a proximate scanned line data when N>1 and when N=1 to compensate and to correct the laser radar system preset rated output lines.

BRIEF DESCRIPTION OF THE DRAWINGS

Other aspects of this invention will become more apparent from the following detailed description when taken in conjunction with the accompanying drawings, in which.

DETAIL DESCRIPTION OF THE PREFERRED EMBODIMENTS

For purposes of modeling simplicity and clarification, the description of the preferred embodiment provided below is based on three assumptions. First, the ground surface beneath an aerial vehicle used while performing laser radar photography using the present invention is a plane surface. Second, an aerial vehicle used while performing laser radar photography using the present invention maintains a constant altitude with respect to the ground surface below. Third, an aerial vehicle used while performing laser radar photography using the present invention encounters no lateral wind.

Figure 1A:
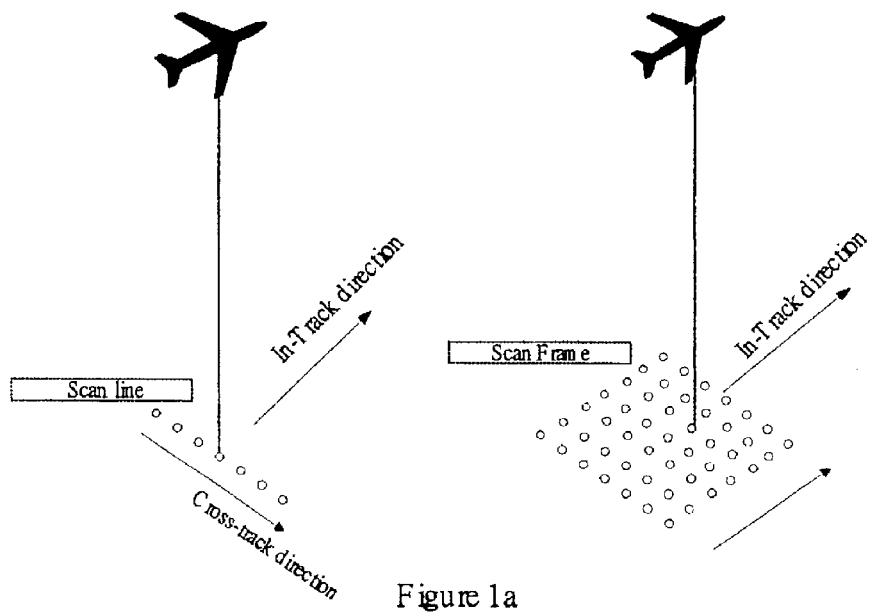
FIG. 1a illustrates a one dimensional photographic scanned line and a two-dimensional photographic scanned frame of the laser radar system of the present invention.

As shown in FIG. 1a, the laser radar photographic system of the present invention mounted on an aerial vehicle such as an airplane is used to scan along a cross-track direction to generate one-dimensional, photographic scanned lines and along an in-track direction to generate two-dimensional, photographic scanned two-dimensional, photographic scanned frames and their corresponding two-dimensional photographs. When the radar system is initially turned on scanning occurs along the cross-track direction and as the aerial vehicle travels along the in-track direction a two-dimensional scanned frame is generated from which desired two-dimensional laser radar photographs are subsequently obtained.

To obtain desirable laser radar photographs both geometric distortion accumulation along the in-track direction and tangential distortion accumulation along the cross-track direction must be minimize or totally eliminated. During the scanning process along the cross-track direction the laser radar of the present invention rotates its three-facet mirror along a 120 degrees angle. The number of light point energy emitted by the laser radar corresponds to the number of points within a scanned line. Thus if one light point energy is emitted then one point will exist within a scanned line and if N light points energy are emitted then N points will exist within a scanned line. During scanning a reference point is marked on the motor controller of the radar system as an index point and the timings (or relative emission angle) of all emitted light points are referenced with respect to the index point, and the light points are emitted at a certain relative angle to the index point. Consistent with the laser's light transmission speed and under ideal conditions the timings of the emitted laser light points and the reflected image points should appear simultaneously. What actually happens is that the emitted laser light points and the reflected image points do not appear simultaneously, but rather when the light points are emitted at equal angles the distance between the image points appeared unequally.

Figure 1B:
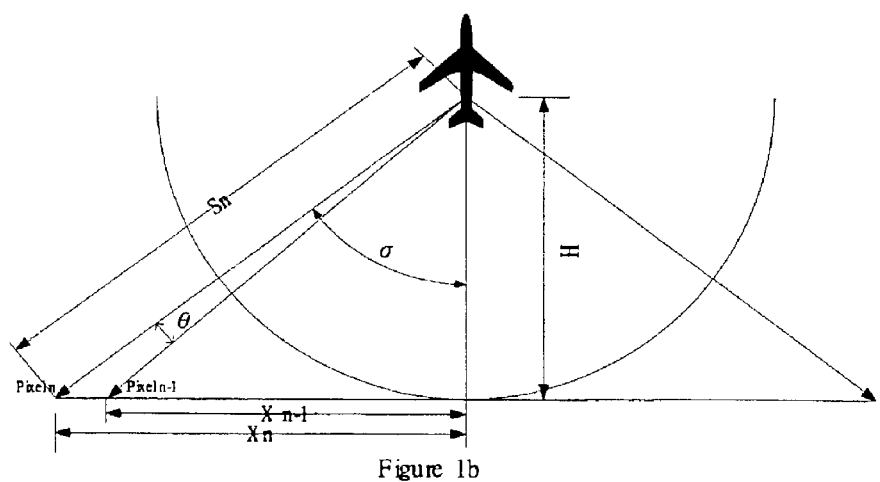
FIG. 1b illustrates a tangential distortion correction diagram along the photographic cross-track direction of the laser radar system of the present invention and accompanying variables used to generate fire table equations to control the laser radar emission timings of the present invention.

FIG. 1b illustrates the method of reducing tangential distortion accumulation along the cross-track direction of the laser radar photographic system of the present invention, which resolves the aforementioned problem of unequal image point distance. The aforementioned problem is resolved through the laser radar's ability to generate and use a fire table of equations to improve the reproduction quality of the laser images and to reduce tangential error accumulation in the cross-track direction during photographing by maintaining equal image point distances.

Specifically, FIG. 1b illustrates a process of generating tangential fire table equations for an image point at a first distance (n) and for an image point at a second distance (n−1) along the cross-track direction. For simplicity, we have chosen to describe the left side along the cross-track direction in FIG. 1b. This is because the right side along the cross-track direction can be mapped from the left side because of their symmetrical relationship. The parameters used to generate a set of tangential fire table equations based on the left side of FIG. 1b are defined as follows:

m—describes the distance between $X_n$ and $X_{n-1}$, i.e. $m = X_n - X_{n-1}$ $X_n$—describes the distance between the image point ($pixel_n$) and the point right beneath the aerial vehicle.

$X_{n-1}$—describes the distance between the image point ($pixel_{n-1}$) and the point right beneath the aerial vehicle.

$H_n$—describes the distance from the aerial vehicle to the earth beneath.

S—describes the distances from the laser radar system mounted on the aerial vehicle to the image points (n and n−1).

θ—describes the angle between two distances: the distance from the aerial vehicle to image point one (n) and the distance from the aerial vehicle to image point two (n−1).

σ—describes the angle between the perpendicular distance from the aerial vehicle to the earth beneath and from the aerial vehicle to the first image point (n).

Based on the illustration of FIG. 1b and the aforementioned parameters defined above, the following fire table equations and related tangential relationships are generated:

$$\tan\sigma = X_n/H; \tag{1}$$

$$\tan(\sigma-\theta) = X_{n-1}/H; \tag{2}$$

$$\sigma = \arctan(X_n/H), \text{ the emission angle of image point one } (n) \tag{3}$$

;and $$\sigma-\theta = \arctan(X_{n-1}/H), \text{ the emission angle of image point two } (n-1). \tag{4}$$

And a set of general tangential fire table equations based on FIG. 1b are expressed as follows:

pixel $n$: $\sigma_n = \sigma = \arctan(m*n/H)$ at distance $X_n$ (5)

pixel $n-1$: $\sigma_{n-1} = \arctan(m*(n-1)/H)$ at distance $X_{n-1}$ (6)

pixel $n-2$: $\sigma_{n-2} = \arctan(m*(n-2)/H)$ at distance $X_{n-2}$ (7)

pixel $n-i$: $\sigma_{n-i} = \arctan(m*(n-i)/H)$ at distance $X_{n-1}$ (8)

The aforementioned generation method and parameters of FIG. 1b described above are used to generate a set of fire table equations for use by the laser radar photographic system of this present invention. The fire table equations corrects the corresponding geometric position of the earth and maintain the distance consistency between the individual image points. This approach illustrated in FIG. 1b is used to generate relevant fire table equations for an aerial vehicle at varying altitudes while maintaining the resolution consistency along the cross-track direction of the laser radar photographic system of the present invention.

The ratio of the cross-track scanned point distance (m=$X_n$ (pixel n)-$X_{n-1}$ (pixel-1)) used in the generation of the fire table equations (Equations 5, 6, 7 and 8) to the ratio of the distance between scanned lines/outputted vision lines (LD) discussed subsequently is maintained at 1:1. An LD/m ratio of 1:1 is critical for maintaining accurate distance between two image points alone both the in-track and cross-track directions. The responsibility of maintaining a 1:1 ratio falls on the laser system's output transmission timing, which is controlled by process control steps 1 through 7 depicted in FIG. 3 of the present invention. In short, when LD=m the geometric and the tangential distortions along the in-track and the cross-track directions respectively are minimized and the reproductive quality of the laser radar images are greatly enhanced.

Figure 2:
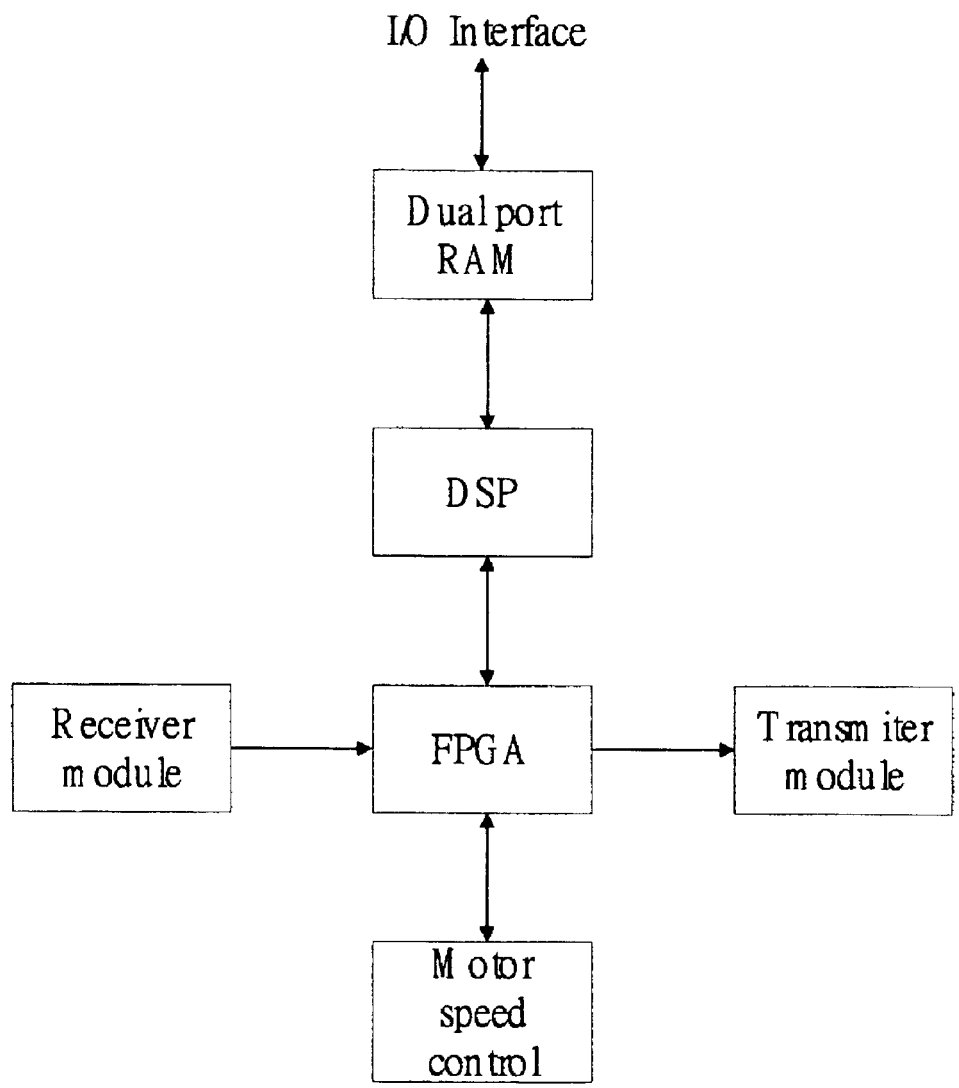
FIG. 2 illustrates a system hardware block diagram of the present invention. The diagram illustrates an I/O interface for storing data, a digital signal processor (DSP) for performing calculation and a field programmable gate array (FPGA) for system control.

FIG. 2 illustrates a system layout of the laser radar photographic hardware system of the present invention. The system's interface I/O collects data such as the light points, spacing data, resolution data, flight altitude data and flight speed data. The data collected through the system's I/O is stored in the Dual Port Ram Memory. The digital signal processor (DSP) uses the data stored in the memory to calculate the rotational speed of the motor and to generate and calculate the fire table equations. Finally, through activation of the Field Programmable Gate Array (FPGA), the DSP controls the motor rotational speed, the transmitter module and the receiver module of the laser radar photographic system hardware of the invention.

Figure 3:
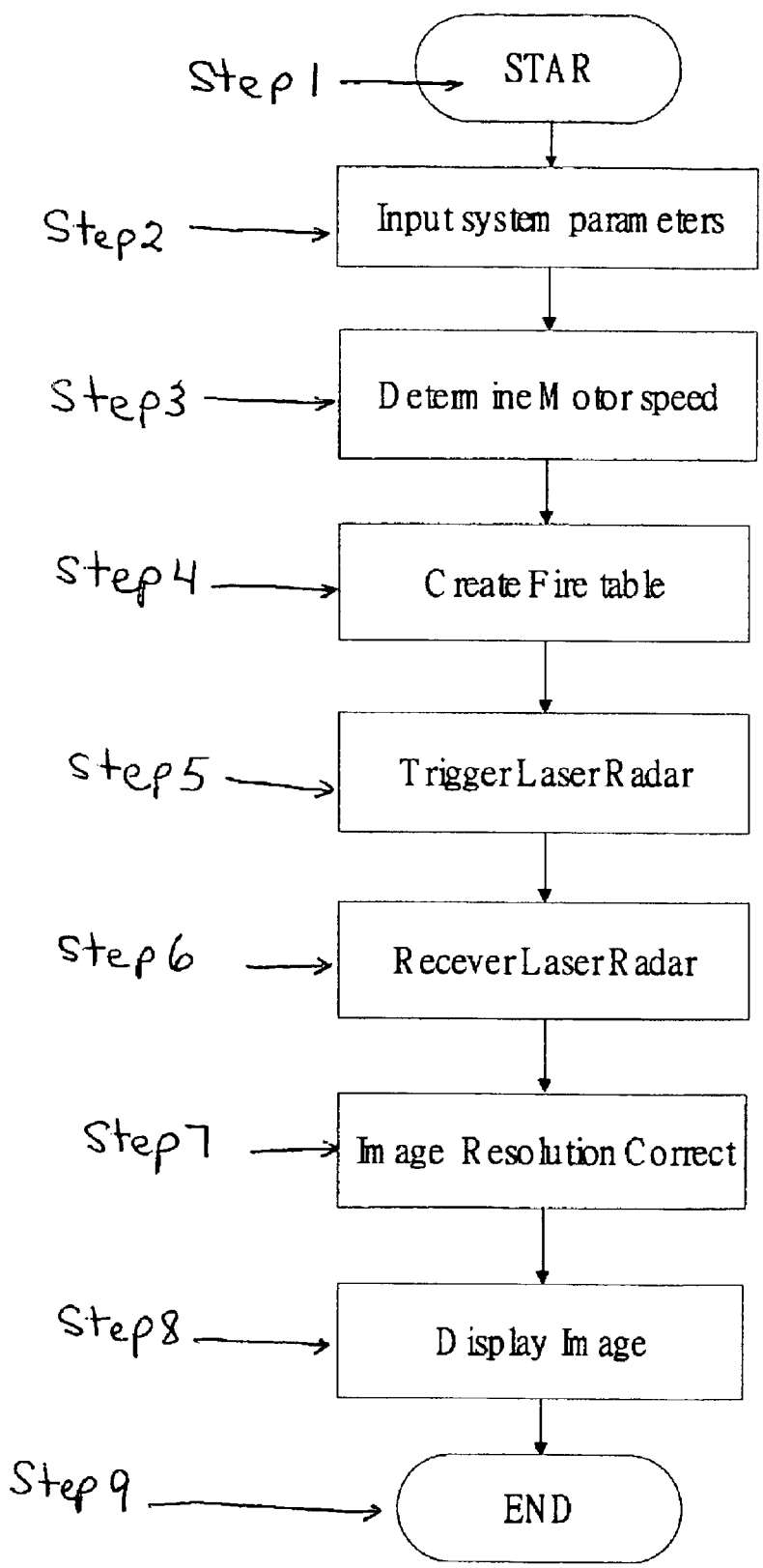
FIG. 3 is a process block diagram illustrating a macroscopic overview of the radar system photographic operation of the present invention.

FIG. 3 is a flow chart process illustrating an operational overview of the laser radar system of the present invention. Referring to FIG. 3, a step 1 of starting the laser radar system and a step 2 of inputting the required system parameters (flight altitude data and light points spacing data, etc) are initials steps of the process of obtaining valuable two-dimensional laser radar photographs of the present invention. A step 3 of determining the laser radar hardware rotational motor speed to maintain the image light points spacing along the cross-track and in-track direction and a step 4 of creating a set of fire table equations for correcting tangential distortions along the cross-track direction of the scanned frame are further initial process steps of obtaining two-dimensional laser radar photographs. In a step 5 and a step 6 respectively, the system triggers the laser radar in accordance with the fire table equations tangential correction and collects the reflected signals. Step 7 deals with the laser image resolution correction and is the most critical process step of the present invention. Correlation resolution correction is performed each time a scanned line from a facet mirror is completed. After resolution correction in step 7 the resulting image is displayed in a step 8 and the process ends in a step 9.

Pursuant to the previous paragraph, FIG. 2 step 7 is the most critical process step of the present invention. At step 7, image resolution correction occurs and accumulated in-track geometric distortion error is greatly reduced. The present invention teaches two unique algorithms used at this process step, which do not increase the system complexity and yet reduce the accumulation of the in-track geometric distortion error during photographing. The first algorithm is for correcting image resolution by reducing in-track geometric distortion when N>1—when multiple scanned vision data is outputted for a single scanned line (N). The second algorithm is for correcting image resolution by reducing in-track geometric distortion when N=1—when a single scanned vision data is outputted for a single scanned line (N).

Figure 4A:
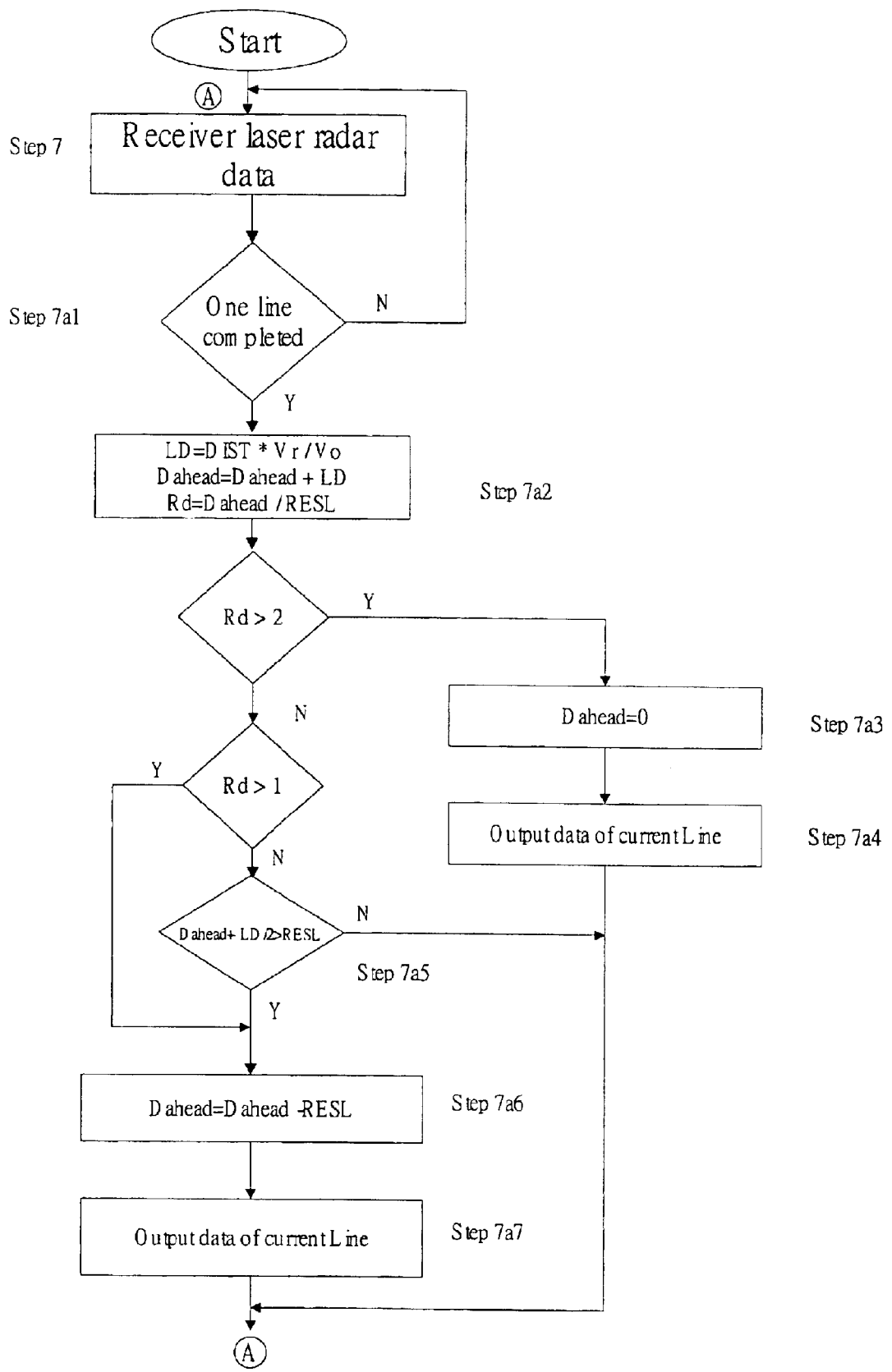
FIG. 4a is a block diagram illustrating the aerial vehicle speed error correlation process substeps of the radar photographic system of the present invention for two-dimensional visual reproduction when N>1.
Figure 4B:
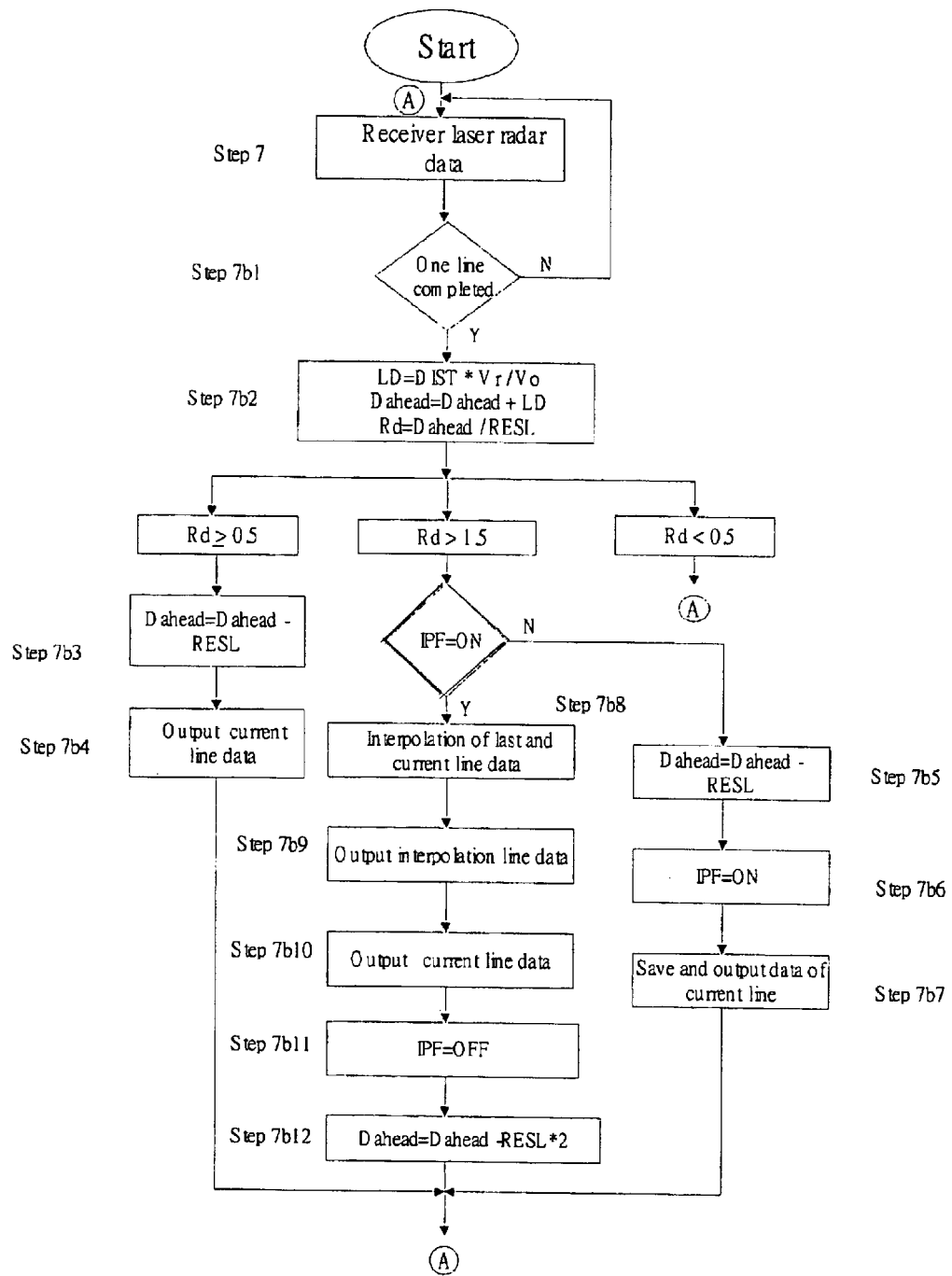
FIG. 4b is a block diagram illustrating the aerial vehicle speed error correlation process substeps of the radar photographic system of the present invention for two-dimensional visual reproduction when N=1.

FIG. 4a, which is a first preferred embodiment of this invention, illustrates the first algorithm flow chart diagraming substeps of step 7 in FIG. 3, for correcting image resolution by reducing in-track geometric distortion when N>1. FIG. 4b, which is a second preferred embodiment of this invention, illustrates the second algorithm flow chart diagraming substeps of step 7 in FIG. 3, for correcting image resolution by reducing in-track geometric distortion when N=1. The parameters used in both the first algorithm and the second algorithm are defined as follows:

N—describes a quantity of scanned vision data outputted for scanned vision line s.

$V_o$—describes an initial preset speed of an aerial vehicle immediately prior to photographing.

$V_r$—describes an actual aerial speed at the time of photographing.

DIST—describes a line distance between each scanned line.

RESL—describes a system rated output line distance (RESL=N×DIST).

Dahead—describes a balance of a moving distance of an aerial vehicle since the last outputted data; wherein the balance can be a positive or a negative number and the initial value is set at zero.

Rd—describes a ratio of the Dahead to the system output line distance.

IPF—describes an interpolation flag of the algorithm.

LD—describes a distance between outputted vision lines.

Now referring to FIG. 4a, for N>1, after receiving the laser radar signal/data at step 7 and after completing at least one scanned line at substep $7a_1$, proceed to substep $7a_2$ for calculating an LD value, for calculating a Dahead value and for calculating an Rd value by performing DIST*Vr/Vo, Dahead+LD and Dahead/RESL respectively. If however substep $7a_1$ does not result in at least one complete scanned line then result to performing step 7 again by receiving the laser radar signal/data until at least one scanned line is complete. If, however, the calculated Rd value in substep $7a_2$ is greater than 2 then perform substep $7a_3$ by setting the Dahead value equal to zero followed by outputting the current vision line data pursuant to substep $7a_4$ and subsequently returning to receiving laser radar data in step 7.

Still referring to FIG. 4a of the present invention, if the calculated Rd value in substep $7a_2$ is less than 2 but greater than 1 or if the calculated Dahead value plus the calculated LD value is greater than the RESL value in substep $7a_5$ then result to performing substep $7a_6$ by calculating the current Dahead value by subtracting RESL from the existing Dahead value followed by outputting the current vision line data pursuant to substep $7a_7$ and subsequently returning to receiving laser radar data in step 7. If, however, the calculated Dahead value plus the calculated LD value divided by two is not greater than the RESL value then return to receiving laser radar data in step 7.

Now referring to FIG. 4b, for N=1, after receiving the laser radar signal/data at step 7 and after completing at least one scanned line at substep $7b_1$, proceed to substep $7b_2$ for calculating an LD value, a Dahead value and an Rd value by performing DIST*Vr/Vo, Dahead+LD and Dahead/RESL respectively. If however substep $7b_1$ does not result in at least one complete scanned line then result to performing step 7 again by receiving the laser radar signal/data until at least one scanned line is complete. If the calculated Rd value in substep $7b_2$ is less than 0.5 then return to step 7 by receiving incoming laser radar signal/data. If, however, the calculated Rd value is greater than or equal to 0.5 then proceed to substep $7b_3$ by calculating the current Dahead value by subtracting the existing RESL value from the existing Dahead value, followed by performing substep $7b_4$ by outputting the current vision data line and subsequently returning to step 7 by receiving incoming laser radar signal data.

Still referring to FIG. 4b of the present invention, if the calculated Rd value is greater than 1.5 and if the IPF is turned off then perform substep $7b_5$ by calculating the current Dahead value by subtracting the existing RESL value from the existing Dahead value, followed by turning the IPF on in substep $7b_6$, saving and outputting the current vision line in substep $7b_7$ and subsequently returning to step 7 by receiving incoming laser radar signal and data. If, however, the IPF is turned on then performed substep $7b_8$ by interpolating the previous and current vision line data, followed by outputting the interpolated vision line data and outputting the current line data in substeps $7b_9$ and $7b_{10}$ respectively. Finally perform substep $7b_{11}$ for turning the IPF off followed by substep $7b_{12}$ for calculating the current Dahead value by multiplying NDL2L by two and subtracting the obtained value from the existing Dahead value and subsequently performing step 7 for receiving incoming laser radar signal/data.

The algorithms disclosed in FIG. 4a and FIG. 4b also reduce and maintain accumulated geometric distortions based on the moving distance and the speed of the aerial vehicle by controlling the timing for replacing the laser radar system's preset, rated output lines with proximate scanned lines which are outputted as vision lines. Before using the laser radar to photograph pictures, for example when N=1, the aerial vehicle's speed is set to its initial value $V_o$ in accordance with the laser radar's motor rotational speed for driving the radar's three facets mirror to ensure that every scanned line (N) outputs one vision line data, and to maintain the scanned lines spacing at a constant. Inevitably, air turbulence changes the aerial vehicle's speed from $V_o$ to $V_r$ thereby varying the line spacing between the scanned lines and thus accumulating geometric distortions. Thus controlling the timing for replacing the system's preset output lines is critical for controlling the distance between two successive scanned lines, which in turn is critical for controlling the quantity of geometric distortions exhibited in the laser radar photographic images.

Figure 5:
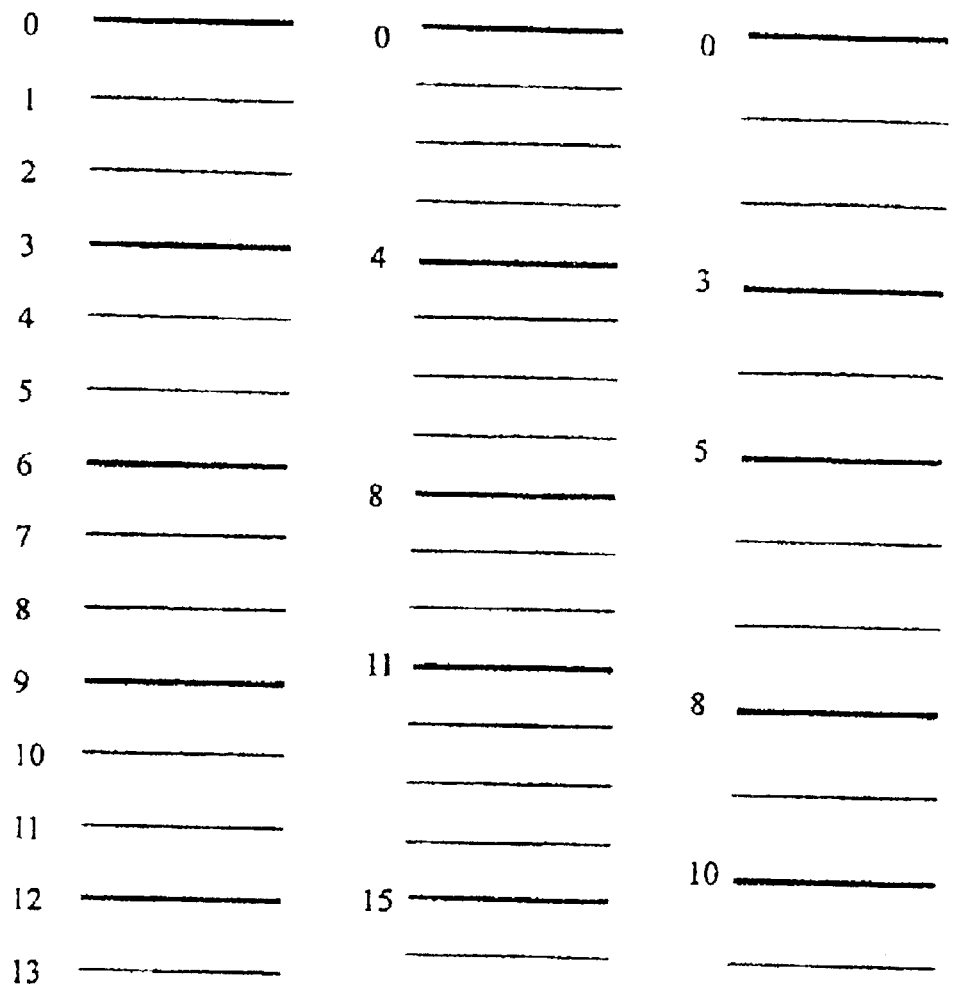
FIG. 5 illustrates the best timing for replacing the radar photographic system's rated output lines with proximate scanned lines to serve as outputted vision lines when N=3, wherein the heavy lines indicate the positions of the outputted vision lines data.

FIG. 5 illustrates the three distinct columns of scanned lines and their corresponding outputted vision lines for N>1, corresponding to the first preferred embodiment of this invention: the right column represents the aerial vehicle photographing at high speed; the left column represents the aerial vehicle photographing at a constant speed; and the middle column represents the aerial vehicle photographing at a slow speed. The faster the aerial vehicle travels while photographing the wider the distance from one scanned/vision line to another. In contrast, the slower the aerial vehicle travels while photographing the shorter the distance from one scanned/vision line to another. Thus, if the right column is compared to the left column the line spacing in the right column is wider than the left column for the identical flying duration. Similarly, if the left column is compared to the middle column the line spacing of the left column is wider than the middle column for the identical flying duration.

Still referring to FIG. 5, the left "constant speed" column, where N=3, outputs one vision line for every three scanned lines. The middle "slow speed" column does not output one vision line for every three scanned lines, instead one vision line is outputted for every three or four scanned lines, which increases geometric distortions due to the inconsistent number of outputted scanned lines. For the middle "slow speed" column the outputted data lines are numbered 0, 4, 8,11, 15 ..., and the system's preset, rated output lines data are replaced with proximate scanned lines data, which are then converted to scanned vision lines data. A similar phenomenon is observed in the right "fast speed" column, where one outputted vision line is not outputted for three scanned lines. Instead one vision line is outputted for every two or three scan lines, which also increases geometric distortions due to the inconsistent number of outputted scanned lines. Therefore, the best timing for controlling and replacing the laser radar system's preset, rated output lines with proximate scanned lines which are outputted as vision lines is illustrated in the left "constant speed" column for N=3. Unlike the right "fast speed" column and the middle "slow speed" column, the left "constant speed" column constantly outputs one vision line for every three scanned lines and thus effectively controls and maintains an even distance between the scanned lines, which is critical in preventing geometric distortion accumulation.

Figure 6:
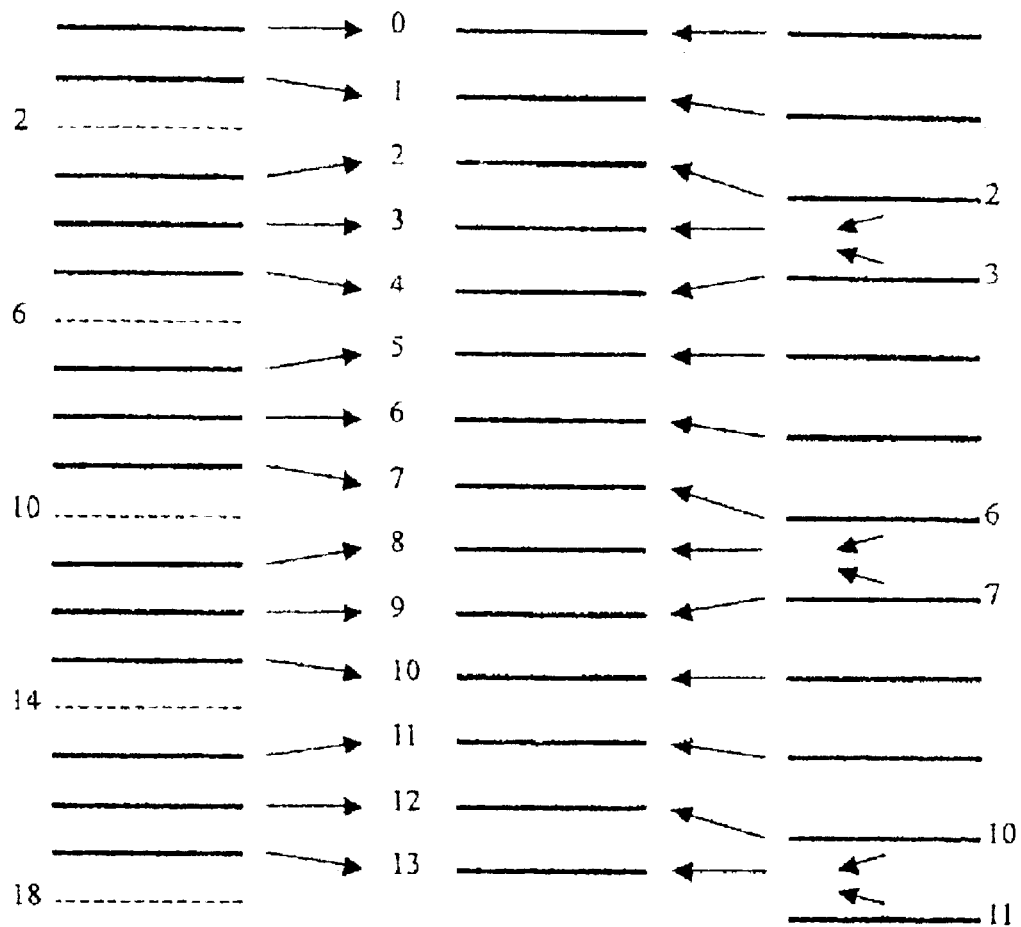
FIG. 6 illustrates the best timing for replacing the radar photographic system's rated output lines with proximate scanned lines to serve as outputted vision lines when N=1, wherein the heavy lines indicate the positions of the outputted vision lines data and the dotted lines in the slow fly column indicate those lines being abandoned.

FIG. 6 illustrates another three distinct columns of scanned lines and their corresponding outputted vision lines for N=1, corresponding to the second preferred embodiment of this invention: the right column represents the aerial vehicle photographing at high speed; the left column represents the aerial vehicle photographing at a "slow speed"; and the middle column represents the aerial vehicle photographing at a "constant speed". For the middle "constant speed" column one vision line is outputted for one scanned line. In contrast, for the left "slow speed" column not every scanned line outputs a vision line. Instead some of the lines are illustrated as dotted and abandoned. Still referring to FIG. 6, the outputted data lines of the left "slow speed" column are numbered 0–1, 3–5, 7–9, 11–13 ..., the dotted abandoned lines are 2, 6, 10 ..., and the system's preset, rated output lines data are replaced with proximate scanned lines data which are then converted to scanned vision lines data. Finally, for the right "fast speed" column every scanned line does not directly output one vision line. Instead some scanned lines must undergo average interpolation to ensure that the system outputted vision lines are in compliance with the system rated output lines. Referring to the right "fast speed" column of FIG. 6, the lines numbered 2 and 3, 6 and 7 and 10 and 11 undergo average interpolation prior to replacing the system's preset, rated output lines with proximate scanned lines which are outputted as vision lines.

Figure 7:
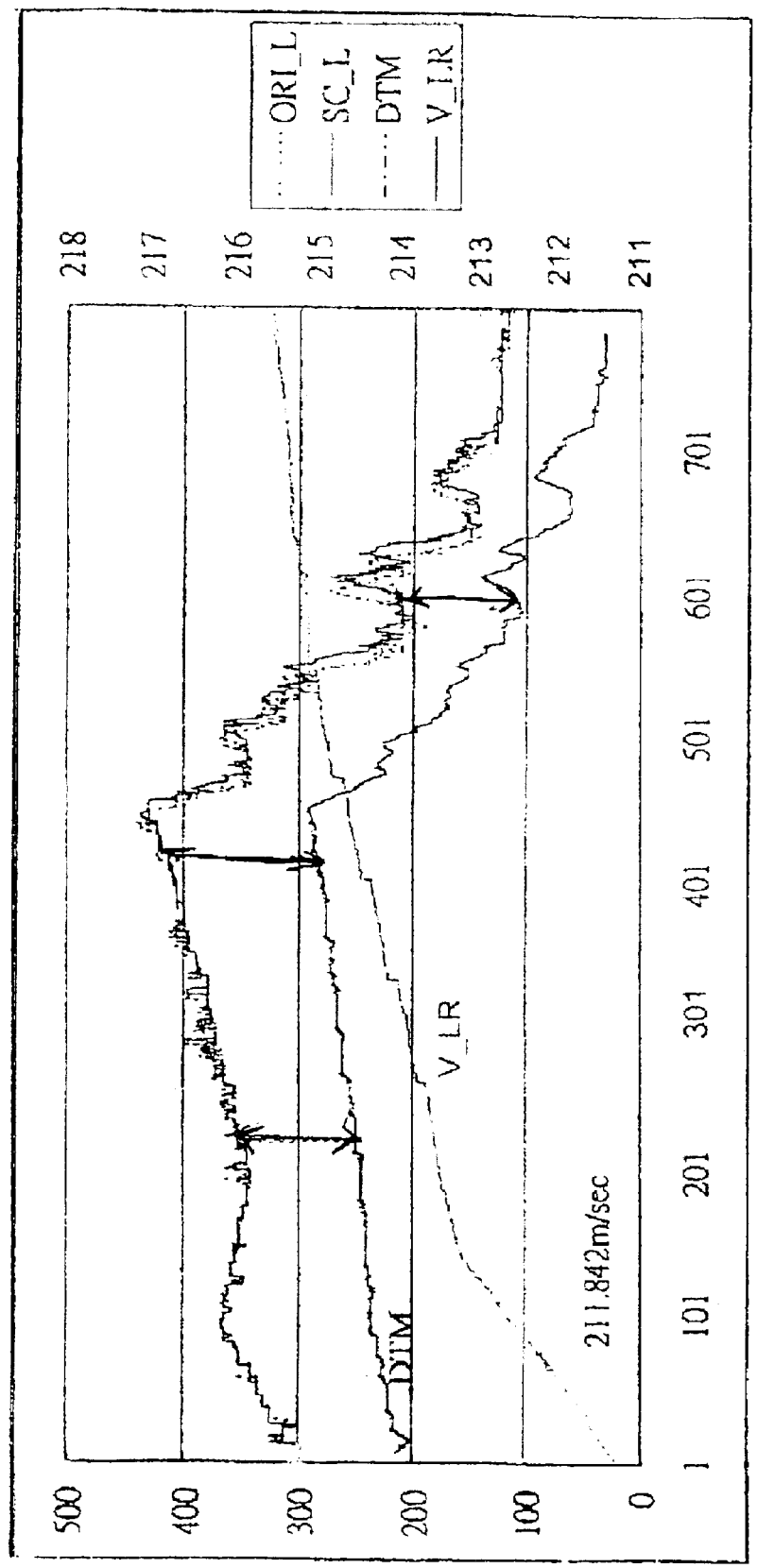
FIG. 7 illustrates the laser radar system of the present invention being used in a mountainous area to obtain one-dimensional photographic experimental data.
Figure 8:
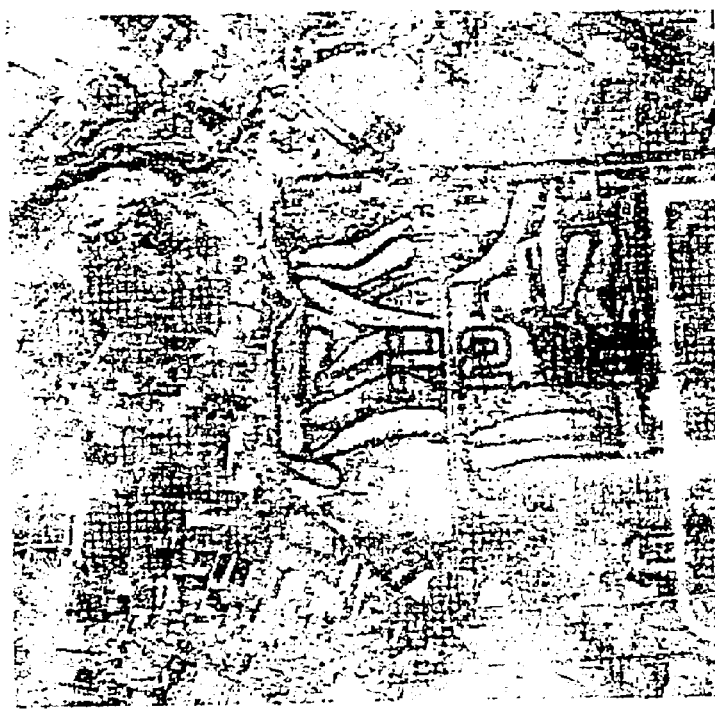
FIG. 8 illustrates the laser radar system of the present invention being used on a golf course to obtain experimental speed correlation data thereof.
Figure 8:
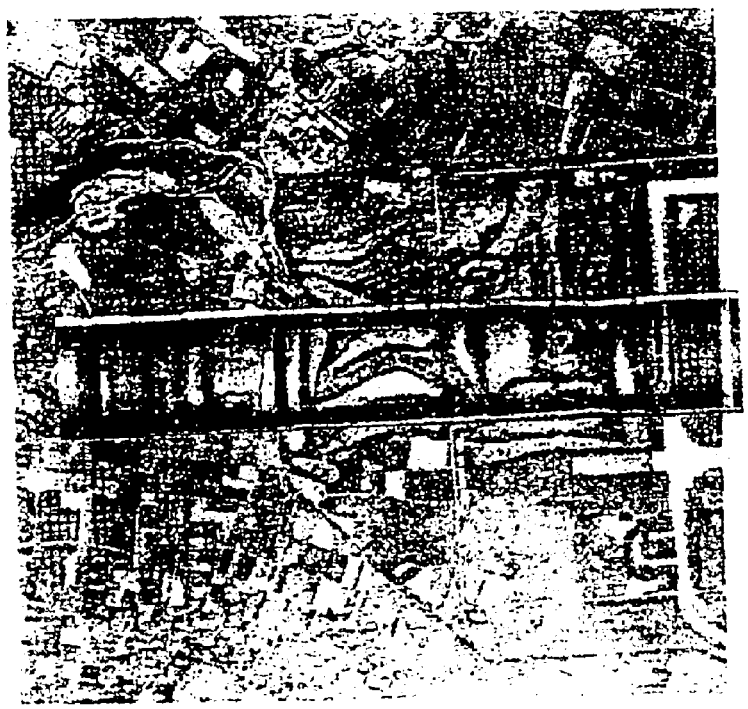
Figure 8:

Using the algorithms illustrated in FIG. 4a and FIG. 4b the timing for replacing the system's preset output lines is controlled and the line spacing of the rated output lines is usually between 0.5 and 10 meters, and except for a few land terrain photographs the resolution of most land terrain photographs are within this range. When photographs are taken from an aerial vehicle flying above 500 meters the variation of the terrain or the landform is of little significance. FIG. 7 and FIG. 8 further illustrate and experimentally corroborate the unique and advanced features of the speed error correlation method of the present invention.

FIG. 7 illustrates a one-dimensional photograph of a mountainous area used for obtaining experimental data. A single x axis or the abscissa represents the system rated output lines. In contrast the y axis or the ordinate is divided into a right ordinate and a left ordinate. The right ordinate represents the aerial vehicle speed (m/s) and the left ordinate represents the terrain height. Towards the left portion of FIG. 7, the lowest curve represents the cross sectional view of the aerial speed during photographing with the laser radar (V-LR). The uppermost dotted line, which is indicative of geometric distortion, represents the centered surface cross sectional view of the distance vision line (ORI-L) prior to applying the speed error correlation of the present invention, and the solid line represents the centered surface cross sectional view of the distance vision line (SC-L) after applying the speed error correlation of the present invention. Both curves are compared to a middle reference curve (DTM) which represents an actual centered terrain cross sectional view.

Still referring to FIG. 7, for effective comparison to the actual terrain centered cross sectional view (DTM), the height of the centered surface cross sectional view of the distance vision line (ORI-L) is positioned upwards prior to applying the speed error correlation method of the present invention. Similarly, the height of the centered surface cross sectional view of the distance vision line (SC-L) is positioned upwards after applying the speed error correlation method of the present invention. The comparison shows that as high speed laser photographing occurs, the line spacing between the ORI-L and the SC-L on one hand and the DTM on the other hand narrowed, and the dotted ORI-L curve (containing geometric distortions) is depressed. Such results further validate that the aerial vehicle speed error correlation method for reproducing two-dimensional laser radar is capable of timely correcting accumulated geometric errors due to high and unstable aerial speed.

FIG. 8 shows photographic results from the laser radar of the present invention when used to obtain experimental, speed-correlated vision lines data of a golf course. The photographs on the right, left and middle of FIG. 8 are a reference golf course image, an actual golf course image using the error-correlated method of the present invention and a superimposed error-correlated golf course image on the reference golf course image respectively. The white rectangular frame shown on the center of the middle photograph indicates that the speed error correlation method of the present invention indeed improves the quality of the laser radar photographs of the present invention.

Finally, the aerial vehicle speed error correlation algorithms described in FIG. 4a and FIG. 4b are executed with no complexity, are simple and practical and are in compliance with the real requirements of the system's functions. Furthermore, the method of this invention results in high quality photographs and thus further reduces the costs associated with reproducing these photographs.

While particular embodiments of this invention have been shown in the drawings and description above, it will be apparent that many changes may be made in the form, arrangement and positioning of the various elements of the combination. In consideration thereof it should be understood that the preferred embodiments of this invention disclosed herein are intended to be illustrative only and not intended to limit the scope of the invention. Any modifications are within the spirit and scope of the invention, which are limited and defined only by the appended claims.

What is claimed is:

1. An aerial vehicle laser radar photographic method using tangential and geometric speed error correlation algorithms for two-dimensional visual reproduction of laser images when N>1 comprising the steps of:

receiving photographic laser radar signal data; scanning at least one complete line; calculating an LD value as DIST*Vr/Vo, where DIST describes a line distance between each completed scanned line, Vr describes an actual aerial speed at the time of photographing and Vo describes an initial preset speed of an aerial vehicle immediately prior to photographing;

calculating a Dahead value as Dahead+LD, where Dahead describes a balance of a moving distance of an aerial vehicle since the last outputted data, wherein the balance can be a positive or a negative number with an initial value set at zero, and LD describes a distance between outputted vision lines; and calculating an Rd value as Dahead/RESL, where RESL describes a system rated output line distance and Rd describes a ratio of the Dahead to the system output line distance; and outputting scanned line(s) as vision line data and replacing the laser radar's preset rated output line data with proximate scan line data after resetting a Dahead value to zero and if said Rd value calculated is greater than 2 and a moving distance of an aerial vehicle has exceeded two lines distance of the laser radar system's preset rated output lines; and thereby reproducing two-dimensional visual laser radar images for N>1 by restricting geometric distortion errors to within one system rated output line distance, where N describes a quantity of scanned vison data outputted for scanned vision lines.

2. An aerial vehicle laser radar photographic method using tangential and geometric speed error correlation algorithms for two-dimensional visual reproduction of laser images as forth in claim 1 further comprising the steps of:

calculating a Dahead value as Dahead−RESL, when Rd is greater than 1 or when Dahead+LD/2 is greater than RESL; outputting completed scanned line(s) as vision line data; and replacing the laser radar's preset rated output line data with proximate scan line data.

3. An aerial vehicle laser radar photographic method using tangential and geometric speed error correlation algorithms for two-dimensional visual reproduction of laser images when N=1 comprising the steps of:

receiving photographic laser radar signal data; scanning at least one complete line; calculating an LD value as DIST*Vr/Vo, where DIST describes a line distance between each completed scanned line, Vr describes an actual aerial speed at the time of photographing and Vo describes an initial preset speed of an aerial vehicle immediately prior to photographing;

calculating a Dahead value as Dahead+LD, where Dahead describes a balance of a moving distance of an aerial vehicle since the last outputted data, wherein the balance can be a positive or a negative number with an initial value set at zero, and LD describes a distance between outputted vision lines; and calculating an Rd value as Dahead/RESL, where RESL describes a system rated output line distance and Rd describes the ratio of the Dahead to the system output line distance; and abandoning said complete scanned line(s) when Rd is less than 0.5; outputting said complete scanned line(s) as vision line data when Rd is greater or equal to 0.5 subsequent to calculating a Dahead value as Dahead−RESL; and thereby reproducing two-dimensional visual laser radar images for N=1 by restricting geometric distortion errors to within one system rated output line distance, where N describes a quantity of scanned vison data outputted for scanned vision lines.

4. An aerial vehicle laser radar photographic method using tangential and geometric speed error correlation algorithms for two-dimensional visual reproduction of laser images as forth in claim 3 further comprising the steps of:

calculating a Dahead value as Dahead−RESL, setting the IPF, the algorithm interpolation flag, on if the IPF is turned off, and saving and outputting current vision line data when said Rd value is greater than 1.5; interpolating previous and current vision line data if the IPF is turned on; outputting interpolated vision line data; outputting current line data; setting the IPF off; and calculating a Dahead value as Dahead−RESL*2.

5. An aerial vehicle laser radar photographic method using tangential and geometric speed error correlation algorithms for two-dimensional visual reproduction of laser images as forth in claim 4 further comprising the steps of:

compensating said error correlation method using interpolation; and correcting said error correlation method using interpolation.

* * * * *